May 19, 1964     K. NICOLAY     3,133,465

CLOTH CUTTING APPARATUS

Filed Aug. 23, 1962     4 Sheets-Sheet 1

INVENTOR
KARL NICOLAY
BY *Kenwood Ross*
ATTORNEY

INVENTOR
KARL NICOLAY
BY Kenwood Ross
ATTORNEY

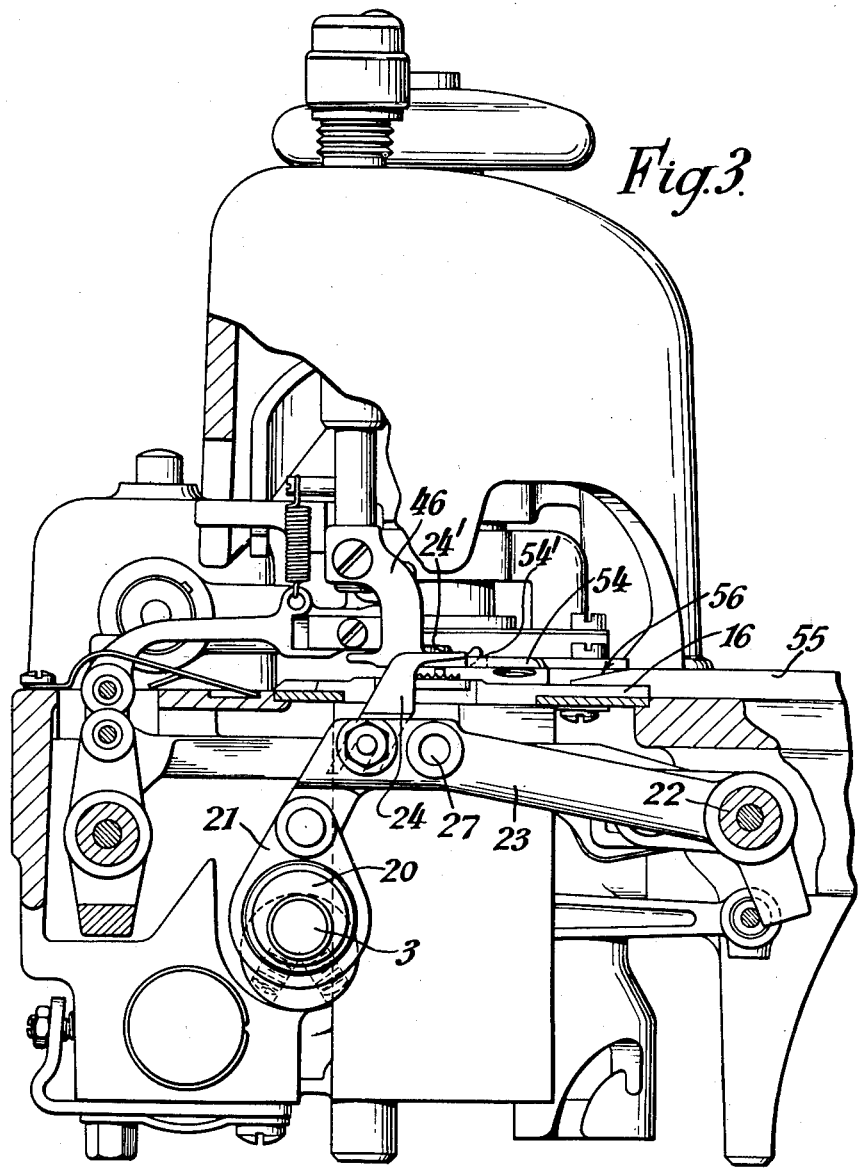

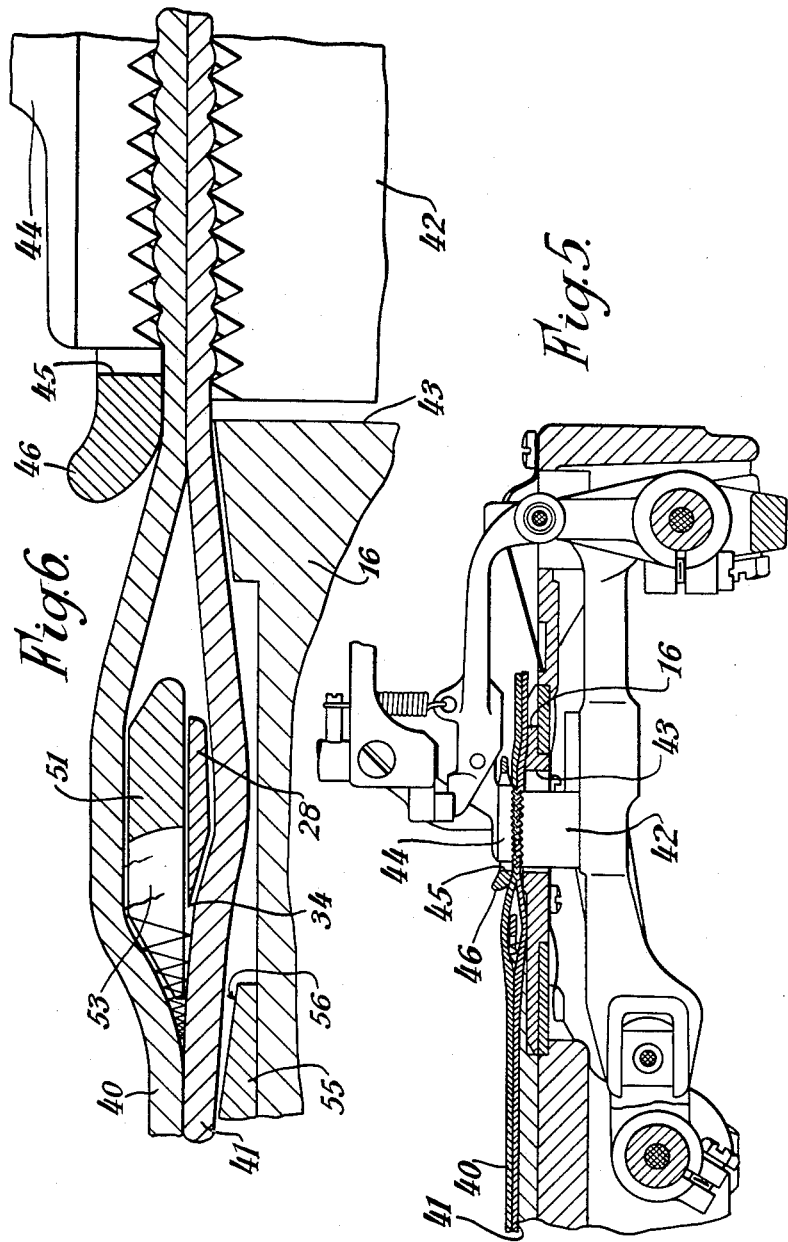

United States Patent Office 3,133,465
Patented May 19, 1964

3,133,465
CLOTH CUTTING APPARATUS
Karl Nicolay, Bielefeld, Germany, assignor to Durkoppwerke Aktiengesellschaft, a corporation of Germany
Filed Aug. 23, 1962, Ser. No. 219,047
Claims priority, application Germany Feb. 15, 1962
1 Claim. (Cl. 83—4)

This invention relates to a machine for the cutting of profiled edges of material, in particular devices which ensure on such cutting machines an uninterrupted running of the cutting procedure.

The improved cutting machine embraces in known manner cutting tool arrangements which so co-operate with each other that in one working procedure the edges of upper and lower layers of material may be cut simultaneously with the profiled edges spaced apart, for example the edge of a quilted linen horsehair lining can be cut back relative to an upper material edge, both edges having the same profile. For this purpose a cutting tool operates first horizontally between the layers of material, in order to sever the threads of the basting or tacking stitches in the area between the profile cuts, and then operates vertically in two planes in order to cut the edges of the upper material and of the underlining at a uniform distance apart. A machine of this type is set forth in the specification of our earlier application for Patent No. 764,445 filed September 30, 1958, now Patent No. 3,036,321.

With these cutting procedures it is necessary so to guide the material layers towards and away from the cutting device that they are not moved relatively to each other and, what is important, so that the upper material does not lie in folds. It may otherwise happen for example that the folded upper material is seized and cut by the knife which severs the basting or tacking thread or is so cut by the profiling cutter that the profiled edge is unusable.

For obtaining an uninterrupted cutting procedure it is an object of the present invention to provide a cutting machine with lower and upper feed means differentially adjustable in relation to the magnitude of feed, for example a known double serrated feeder of this kind, which co-operates with the horizontally cutting separating knife for the basting stitches in such a way that the separating knife carries out a drawing cut during the stationary period of the feed and then recedes with the material when the latter is advanced by the feeder.

It is a further object of the invention to provide that the separating knife, in its effective range, is covered by a knife protector which is provided with a comb which extends into the area of the cutting tool before the horizontally-working knife and is provided with edge-like teeth and which separates the plies of the workpiece and tensions the basting stitches, in front of the knife.

By means of the advance of the cut material in this maner, the basting stitches lying between the layers of the material are stretched upon pushing into the comb and are placed before the separating knife for satisfactory cutting without the layers of material being influenced in their uniform speed. At the same time however the layers of material are also turned away from the cutting edge of the separating knife in that the upper material is guided over the back of the comb covering the separating knife, under the material presser of the machine, and the underlining is transported by the feed device in the normal way below the separating knife above the base of the machine. In order to prevent the upper knife of the cutting tool for the cutting back of the underlining being able to influence adversely the upper material on its way over the back of the comb as far as under the material presser of the machine there is provided on the comb of the knife protector a run-off tongue which holds the marginal part of the upper layer raised.

A representative embodiment of the invention is illustrated in the accompanying drawings, wherein:

FIG. 3 is a front view of the machine shown in FIG. 2, also partly in section;

FIG. 4 is a plan showing the arrangement of the cutting tools and the knife protection, a part of the framework being broken away;

FIG. 5 is an enlarged sectional side view of the feed device of the machine; and FIG. 6 is a much enlarged section through the machine with the material layers guided around the knife protection.

Figure 1:
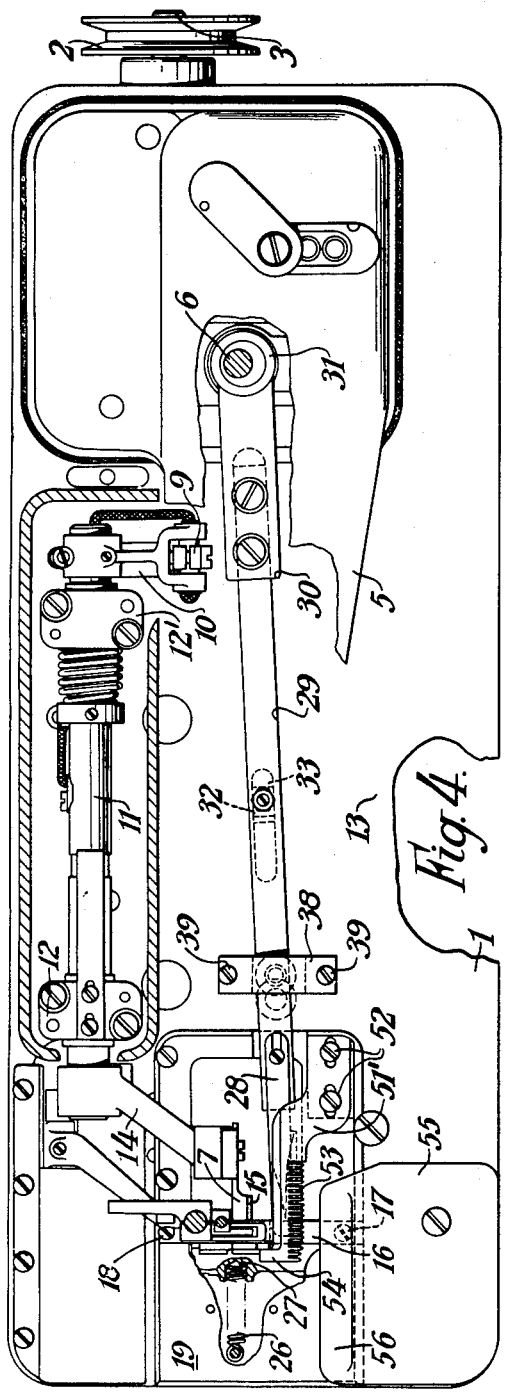
FIG. 1 is a perspective representation of the type of workpiece with which the invention is concerned.

FIG. 1 illustrates the type of work which the machine handles. The outer layer $a$ interlining $b$, inner layer $c$ are united together by basting stitches $d$. The right hand part of the workpiece shown has been trimmed by the machine to leave spaced parallel edges between part $a$ on the one hand and parts $b$ and $c$ on the other hand, and also the severed strip of $b$ and $c$ has been released from the margin of $a$ by the cutting of the stitches $d$ between them.

Referring to FIGS. 2–6 the improved profiled edge cutting machine has in the lower part 1 (FIG. 2) a main shaft 3 driven via a driving wheel 2 in the usual manner from a belt and a motor (not shown). By means of a skew gear drive 4 the rotations of the shaft 3 are transmitted to a vertical shaft 6 mounted in the arm 5 of the machine.

Three cutting tools co-operating for different purposes receive their drive from eccentrics located on the main shaft 3. In the first place a main knife 7 which effects the cutting of the profiled edge of the upper material 40 is driven by an eccentric 8 on the main shaft 3. An eccentric strap 9 surrounds the eccentric 8 and imparts the cutting stroke to the upper knife 7 due to its linking with the lever arm 10 (FIG. 4) which is located on one end of the shaft 11 mounted in bearings 12, 12' on the bed plate 13 of the machine. On the shaft 11 is the lever 14 constituting a carrier for the upper knife 7 which is adjustably mounted on such lever. An under knife 15 is provided and in known manner the upper knife 7 is held resiliently against the edge of such under knife 15. The knife 15 is carried by a bridge piece 16 which is secured by fixing screws 17, 18 on a plate 19 located in the part 1 of the machine. This cutting tool for the profiled edge of the upper material also cuts the linen horsehair underlining 41 at the same time and to the same level.

For the cutting back of the edge of the lining 41 a second cutting tool is used, arranged at about the same height and at the required distance back from the tool 7. For this purpose an eccentric 20, FIG. 3, also located on the main shaft 3 pivots a lever 23 by means of an eccentric strap 21, such lever being pivotable about a bearing shaft 22. On the lever 23 there is adjustably located an upper knife 24 which co-operates with a second under knife edge also carried by the knife bridge 16. The resilient pressing of the cutting edge of the upper knife 24 against the lower knife edge is effected by a compression spring 26. Supported on the said plate 19, this spring 26 presses with its free end in the bore 27 of the lever 23 and thereby the upper knife 24 carried by such lever has its edge pressed against the edge of knife 25.

Finally, there is mounted between and in advance of these two cutting devices a third cutting tool, namely a separating knife 28 (FIG. 4) in order to sever the basting or tacking stitches uniting the two layers of material in the area between the two profiled edges. For this purpose the separating knife 28 is held in a suitable position on a knife holder 29 which extends from and is firmly connected to an eccentric strap 30, the eye of this strap 30 being placed around an eccentric 31 on the above-mentioned vertical shaft 6.

Figure 2:
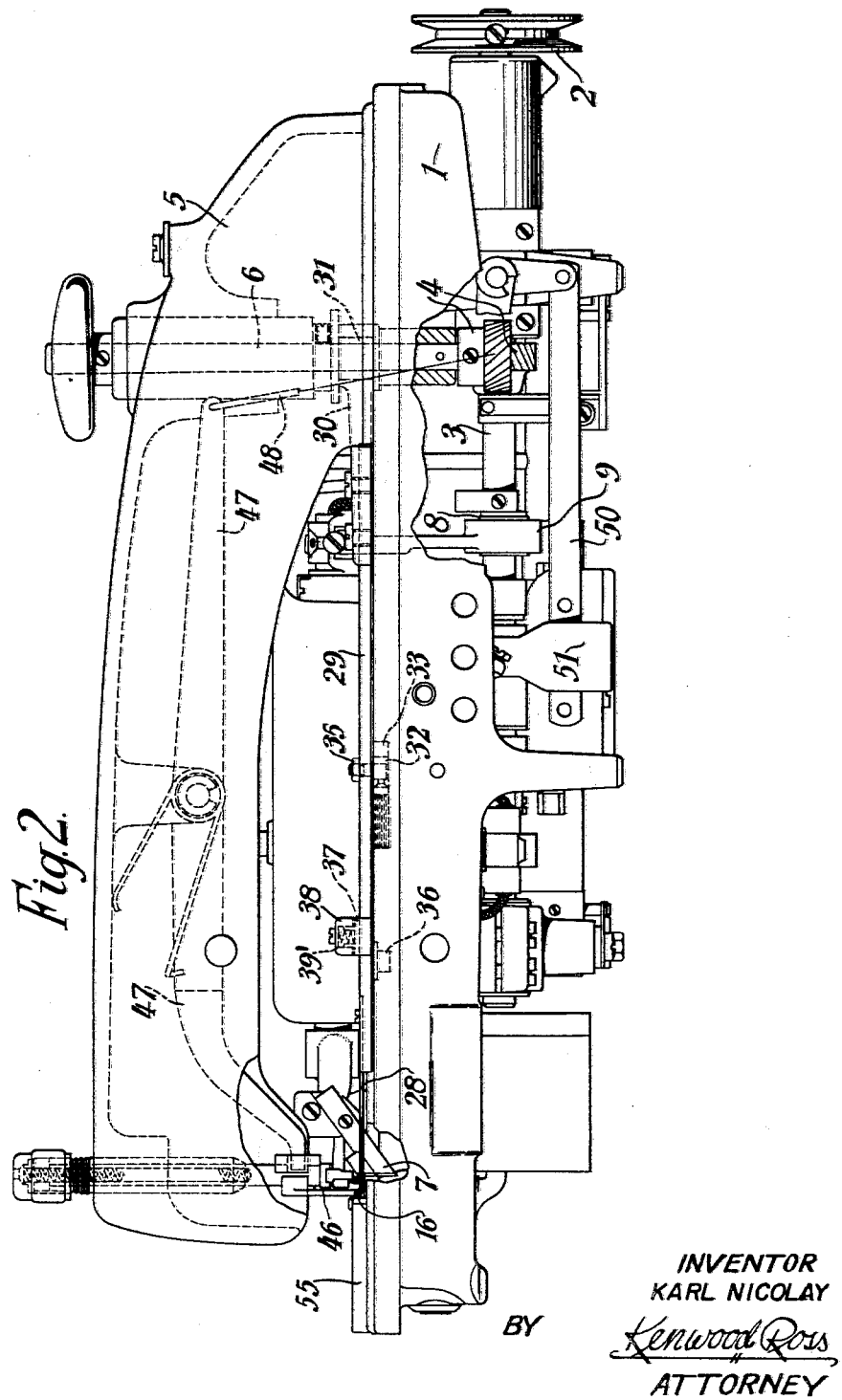
FIG. 2 is a front view of one form of the cutting machine, partly in section to show the main driving means for the cutting tool.

The knife holder 29 is guided in a movement imparted by the eccentric 31 under the control of a slide block 32 carried by it and which enters a guide groove 33 formed in the underpart 1. The feeder 42 is moved to and fro by mechanism driven from shaft 3 in a manner well known in the sewing machine art. Such mechanism is usually driven from an eccentric 9 in shaft 3 and this eccentric will be given an angular relationship with eccentrics 8, 20 and 31 such that the cutting edge 34 of the knife 28 can carry out a drawing cut during the interval between steps of feed of the material layers, and then move in the direction of the feed when the layers of material are advanced. Then, due to the fact that the slide part 32 is fixed to an eccentric stop screw 35 on the knife holder 29 the buff of the edge of the separating knife 28 can be adjusted in position by adjusting the position of the eccentric stop screw 35, according to the requirements of the machine at the time. For the horizontal mounting of the knife holder 29 there is located in the under part 1 of the machine a bearing strip 36 (FIG. 2). The knife holder 29 is resiliently held against such bearing strip by a stop 37 which is carried by a bridge 38 placed over it. By means of a spring 39', which is supported on the said bridge 38, the stop 27 is pressed down on to the upper face of the knife holder 29. The bridge 38 is fixed on the part 1 of the machine by the screws 39 (FIG. 4).

In order that the upper material 40 and the lower lining 41 with the profiled edges may be guided to and away from the knives corresponding to the requirements of the cutting tools, the cutting machine is preferably provided with a known differential adjustable pincer type transport, that is, under and upper feeders may effect different magnitudes of feed. For this purpose a toothed feeder 42 (FIG. 5) of the lower feed extends up through a slot 43 in the bridge 16 for the feeding of the lower material layer, and a toothed feeder 44 of the upper feed extends downwards through a slot 45 of a pressure foot 46 for the feeding of the upper material layer.

The presser foot 46 is pressed on the knife bridge 16 in the usual manner with an adjustable pressure. It may be raised by the action of a set of rods 47, 48, 50, 51 (see FIG. 2), whereby the upper toothed feeder 44, according to a known arrangement, is also raised from the upper layer of the material.

The invention also provides that the separating knife 28 (FIG. 4) is covered in its working range by a knife protector 51' which is located on the plate 19 by means of fixing screws 52 and is adjustable cross-wise to the direction of feed. The knife protector 51 is provided in the region of the cutting edge of blade 28 with teeth 53 directed towards the direction of feed of the material and which spread out the basting stitches lying between the two layers of material.

In addition, the knife protector 51 has a run-off tongue 54 which is so constructed relatively to the cutting tools for the back-cutting of the underlining, that material guided over the back of the run-off tongue 54 and then under the presser foot 46 during the cutting procedure, cannot be seized by the upper knife 24 of the said cutting apparatus. For this purpose the upper edge 24' of the upper knife 24 (FIG. 3) is so arranged with regard to the upper edge 54' of the tongue 54 that during the operation of the upper knife 24 the upper edge 54' always lies above or at the same level as the upper edge 24' of the upper knife 24. In order that the upper material 40 and the lower lining 41 when running into their separate paths may run freely around the comb of the knife protector 51 there is provided finally a plate 55 with a run-off surface 56. The plate 55 is located in a position corresponding to the position of the comb of the knife protector 51 on the table plate 13 of the under part 1.

What I claim is:

In cloth cutting apparatus for cutting the edges of two superposed layers of material which have been united together over an area by basting stitches so that the resulting edge of one layer will be spaced inwardly from the resulting edge of the remaining layer, the improvement comprising, a support for the superposed layers, a forwardly-extending separating device facing the direction of feed of the layers and shaped so as to tense the basting stitches, lateral cutting means adjacent said separating device and presented to the tensed basting stitches in front thereof, a first edge cutting means located at one side of said separating device, a second edge cutting means located at the other side of said separating device, said first and second edge cutting means each having a blade lying in the direction of feed of the work material, means for advancing the layers intermittently past said first and second edge cutting means, and driving means operating said lateral cutting means and edge cutting means in synchronism with said lateral cutting means during intermissions in the advance of the layers and including means for moving said lateral cutting means forwards to sever tensed basting stitches whilst the workpiece advancing means is stationary and for withdrawing said lateral cutting means with the next advance of the workpiece.

References Cited in the file of this patent

UNITED STATES PATENTS

| | | |
|---|---|---|
| 2,322,207 | Hale | June 22, 1943 |
| 2,549,057 | Chinnici | Apr. 17, 1951 |
| 2,811,123 | Hayes | Oct. 29, 1957 |
| 2,967,498 | Russell | Jan. 10, 1961 |
| 3,063,321 | Nicolay | Nov. 13, 1962 |